(No Model.) 7 Sheets—Sheet 2.

G. A. SCOTT.
PRINTING TELEGRAPH.

No. 529,630. Patented Nov. 20, 1894.

Witnesses:
A. E. Fanamann.
J. S. Barker.

Inventor,
Geo. A. Scott
by Foster & Freeman
attys (No Model.)

G. A. SCOTT.
PRINTING TELEGRAPH.

No. 529,630.

Patented Nov. 20, 1894.

(No Model.)

G. A. SCOTT.
PRINTING TELEGRAPH.

No. 529,630.  Patented Nov. 20, 1894.

UNITED STATES PATENT OFFICE.

GEORGE AUGUSTUS SCOTT, OF LONDON, ENGLAND, ASSIGNOR, BY DIRECT AND MESNE ASSIGNMENTS, TO THE WESTERN UNION TELEGRAPH COMPANY, OF NEW YORK.

PRINTING-TELEGRAPH.

SPECIFICATION forming part of Letters Patent No. 529,630, dated November 20, 1894.

Application filed September 6, 1887. Serial No. 248,961. (No model.) Patented in England June 28, 1887, No. 9,191.

*To all whom it may concern:*

Be it known that I, GEORGE AUGUSTUS SCOTT, a citizen of the United States of America, residing at Belliter Square Buildings, in the city of London, England, have invented Improvements in Type-Printing Telegraphs, (for which I have received Letters Patent in Great Britain, No. 9,191, dated June 28, 1887,) of which the following is a specification.

My said invention consists in part of improvements in the receiving or printing instruments of printing telegraphs worked with three or more wires or on synchronous systems or on synchronous multiplex systems which improvements consist essentially of a series of magnets or solenoids having their armatures or cores so arranged relatively to a flexible connection or flexible connections secured to or engaged either directly or indirectly with the type wheel or the shaft thereof or so arranged relatively to mechanism connected to or engaged with the type wheel or its shaft that the part of the wheel bearing any required letter or character may be turned or permitted to turn round to the printing point by opening or closing the circuit of a battery or the circuits of batteries through the coil or coils of one or more or all of the said magnets or solenoids.

Figure 1:
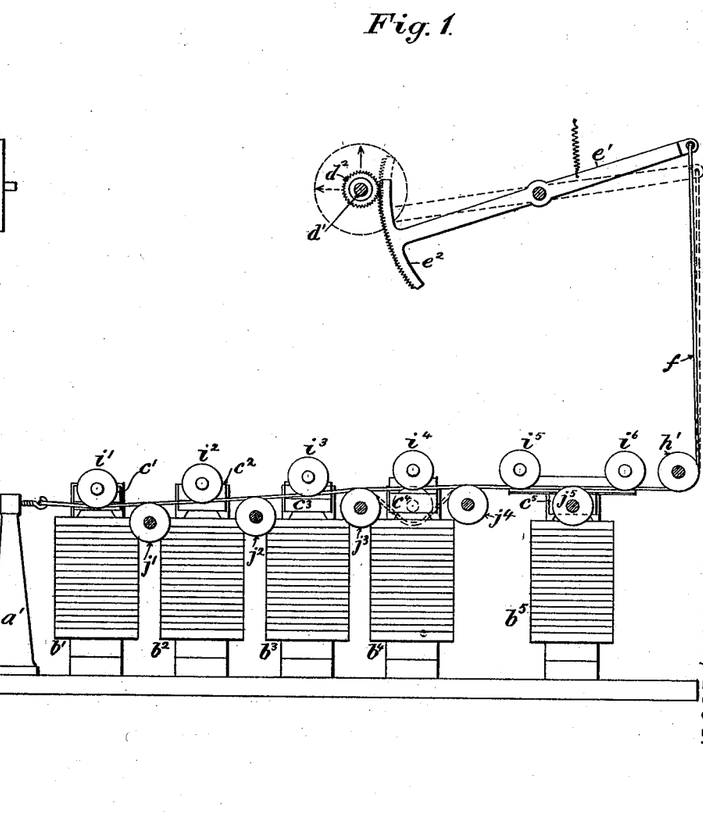
Figures 1 and 2 of the accompanying drawings are elevations taken at right angles to each other showing five magnets and their armatures so arranged relatively to a flexible connection secured to mechanism engaged with the type wheel shaft as to admit of the wheel being turned to any required point by closing the circuit of a battery or the circuits of batteries through one or more or all of the said magnets. In the said Fig. 1 the frame which supports the parts of the mechanism is not shown.
Figure 2:
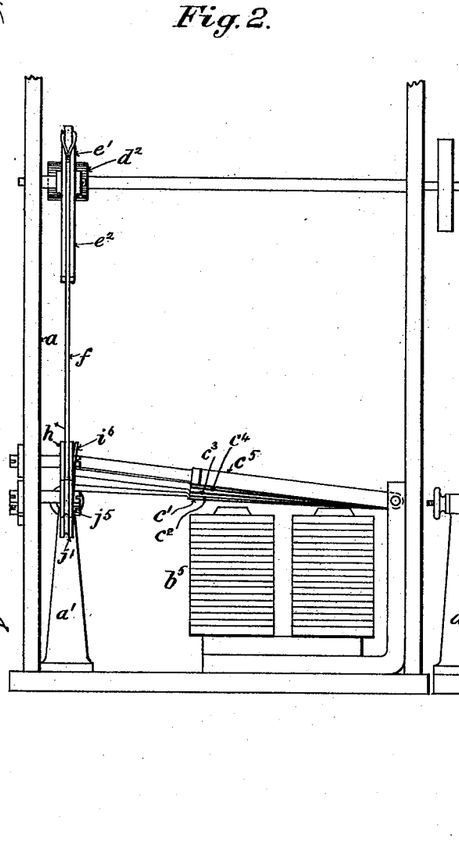

Referring to the said Figs. 1 and 2 $a$ is the frame which supports the type wheel and the working parts of the apparatus. $b'$ $b^2$ $b^3$ $b^4$ $b^5$ are the magnets. $c'$ $c^2$ $c^3$ $c^4$ $c^5$ are the armatures of the said magnets. $d'$ is the type wheel shaft. $e'$ is a lever carrying at one end a sector $e^2$ which gears with a pinion $d^2$ secured to the type wheel shaft to the other end of which lever one end of a flexible connection $f$ is secured which flexible connection passes under a pulley $h'$ carried by the frame $a$ and between a row of pulleys $i'$ $i^2$ $i^3$ $i^4$ $i^5$ $i^6$ carried by the armatures $c'$ $c^2$ $c^3$ $c^4$ $c^5$ and another row of pulleys $j'$ $j^2 j^3 j^4 j^5$ carried by a part of the frame $a$ and is secured at its other end to an adjusting screw working in a standard $a'$ secured to the base of the said frame. The pins or spindles on which the pulleys $j'$ $j^2 j^3 j^4 j^5$ work are so secured to the frame $a$ as to be capable of being raised or lowered and secured at various heights. The coils of the five magnets $b'$ $b^2$ $b^3$ $b^4$ $b^5$ are respectively connected through relays to a local battery or to separate local batteries the circuit or circuits of which is or are closed or opened according to the position of the said relays the coils of each of which relays are also respectively connected to the several receiving segments of the distributer (not shown in the said Figs. 1 and 2) according as one or more or all of the sending out segments of the distributer at the sending station is or are connected to the main battery the effect being to depress the flexible connection $f$ between two or more of the pulleys $i'$ $i^2$ $i^3$ $i^4$ $i^5$ $i^6$ and $j'$ $j^2 j^3 j^4 j^5$ whereby the outer end of the lever $e$ is depressed the extent of depression depending on the number of magnets through which the circuit or circuits is or are closed and the distances between the armatures and the poles of the said magnets. The said Figs. 1 and 2 show the arrangement in the case of the type wheel bearing thirty two letters or characters on its periphery in which case the distances between the respective magnets and their armatures when the circuits are open should be sufficient to cause the separate depression of the five armatures to respectively effect the turning of the type wheel through one thirty second, one sixteenth, one eighth, one fourth, and one half of a revolution the wheel being brought to any one of the other required twenty six positions by the depression at one time of the armatures of two or more or all of the five magnets. To illustrate the effect of closing the circuits through the magnets the position of the parts when the armature $c^4$ is depressed is indicated in dotted lines in Fig. 1 the effect of depressing the said armature being to turn the type wheel through one quarter of a revolution.

Figure 11:
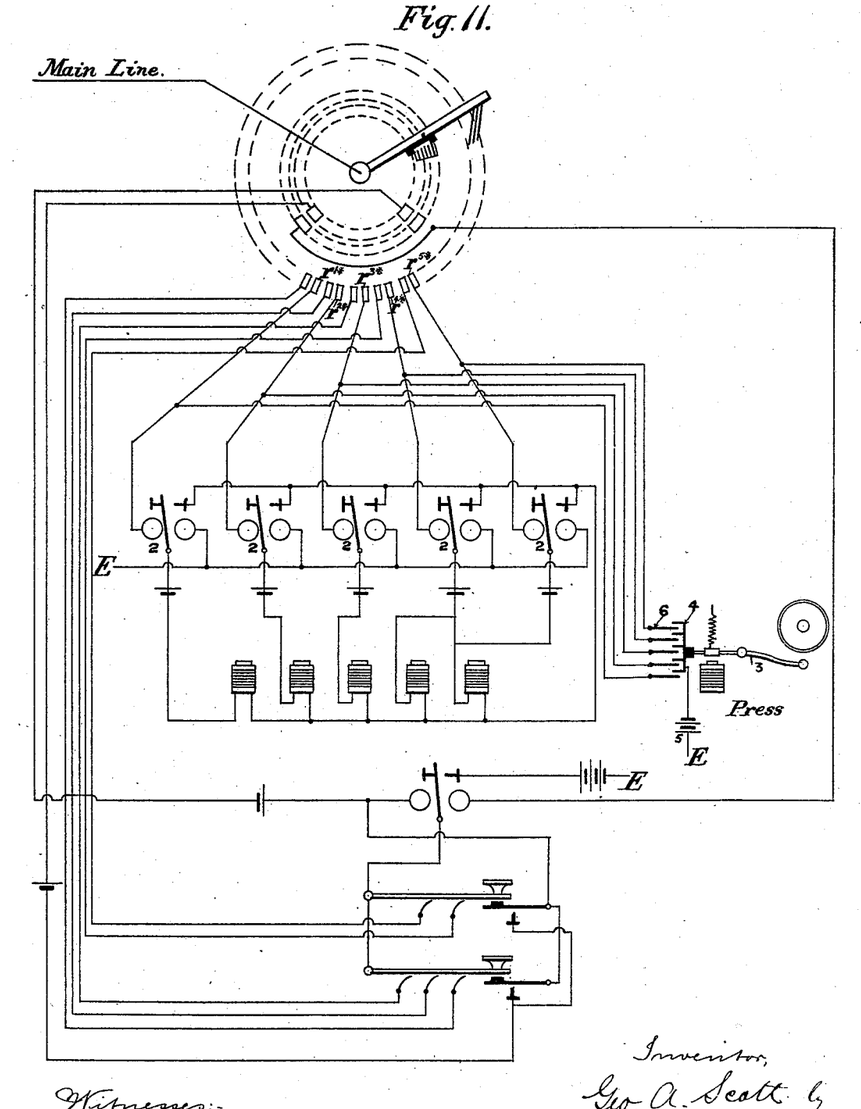

The magnets may be connected to the local batteries and relays and the latter may be connected with the segments of the distributer as illustrated in Fig. 11 of the accompanying drawings which is hereinafter described or the said parts may be otherwise suitably connected.

Figures 3, 4, 5, 7:
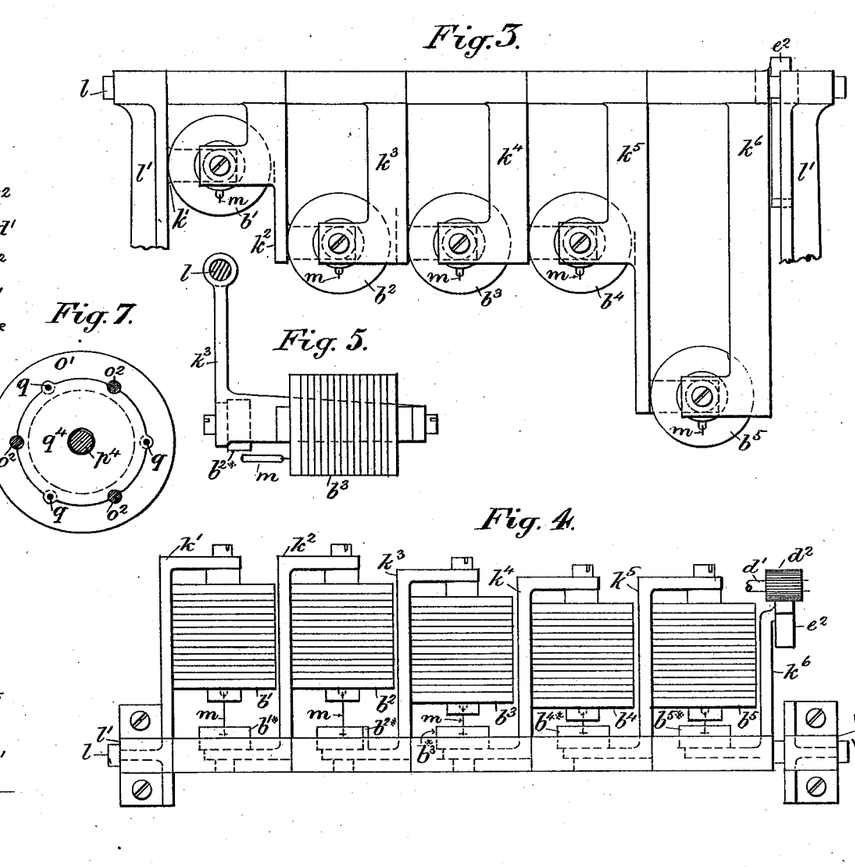
Figs. 3, 4, and 5 illustrate another modification of five magnets and their armatures for effecting the same object, Fig. 3 being an elevation, Fig. 4 a plan, and Fig. 5 a detail view thereof.
Figs. 6 and 7 illustrate an arrangement by which the same result is produced by means of solenoids, Fig. 6 being an elevation and Fig. 7 a transverse section on the line A of Fig. 6.

In the arrangement shown in Figs. 3, 4, and 5 the several magnets $b'$ $b^2$ $b^3$ $b^4$ $b^5$ are respectively carried by arms or levers $k'$ $k^2$ $k^3$ $k^4$ $k^5$ the arms $k^2$ $k^3$ $k^4$ $k^5$ being loosely mounted on a shaft or axis $l$ fixed in the upper ends of standards $l'$ $l'$ to one of which standards the arm $k'$ is secured. The said arm $k^4$ is therefore fixed and the arms $k^2$ $k^3$ $k^4$ $k^5$ are free to swing or vibrate on the shaft or axis $l$. The armatures $b'^*$ $b^{2*}$ $b^{3*}$ $b^{4*}$ of the magnets $b'$ $b^2$ $b^3$ $b^4$ are respectively carried by the arms $k^2$ $k^3$ $k^4$ $k^5$ and the armature $b^{5*}$ of the magnet $b^5$ is carried by an arm $k^6$ which is also loosely mounted on the shaft $l$ and carries the toothed sector $e^2$ which gears with the pinion $d^2$ on the type wheel shaft $d'$ and is normally held in the position shown in the drawings by means of a spring or springs or by means of a weight. The said arms $k'$ $k^2$ $k^3$ $k^4$ $k^5$ $k^6$ are prevented from separating beyond the required distance by means of links $m$ $m$.

Fig. 5 is a side elevation of the arm or lever $k^3$ and the parts carried thereby the shaft or axis $l$ on which the said arm works being in section. The action of this arrangement is essentially the same as that of the arrangement hereinbefore described with reference to Figs. 1 and 2 of the accompanying drawings the closing of the circuit of the battery or batteries through one or more or all of the five magnets causing the type wheel to be turned through a portion of a revolution by the motion of the arm $k^6$ through the medium of the toothed sector $e^2$ carried thereby which toothed sector gears with the pinion $d^2$ on the type wheel shaft $d'$.

Figure 6:
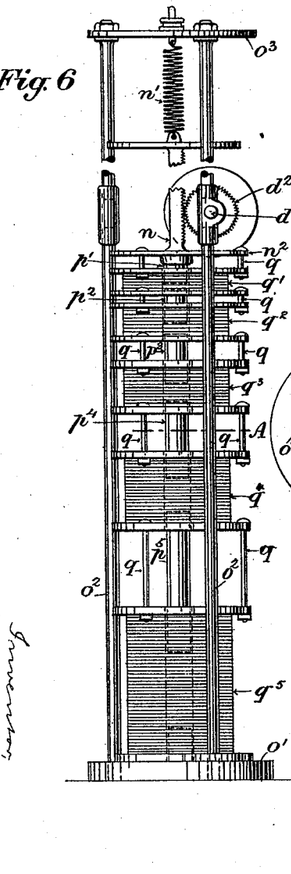

Referring to Figs. 6 and 7 $n$ is a rack which gears with the pinion $d^2$ on the type wheel shaft $d'$ which rack is connected to a spring $n'$ suspended from the upper part of a frame consisting of a base $o'$ and uprights $o^2$ $o^2$ supporting a plate $o^3$. $q'$ $q^2$ $q^3$ $q^4$ $q^5$ are the solenoids which are connected to each other by means of bolts $q$ $q$. The solenoid $q'$ is also connected by the same means to a plate $n^2$ secured to the rack $n$ and the solenoid $q^5$ is also secured to the base $o'$ of the frame. $p'$ $p^2$ $p^3$ $p^4$ $p^5$ are the cores of the several solenoids the core $p'$ being secured at its upper end to the plate $o^3$ and each of the several other cores $p^2$ $p^3$ $p^4$ $p^5$ being respectively secured at its upper end to one of the solenoids $q'$ $q^2$ $q^3$ $q^4$. The holes through which the several bolts $q$ $q$ are passed are of such a size as to allow the said bolts to slide freely therein when the solenoids approach and recede from one another as hereinafter described. The action of this arrangement is essentially similar to that of the arrangements hereinbefore described with reference to Figs. 1 and 2 of the accompanying drawings and with reference to Figs. 3, 4, and 5 of the accompanying drawings the closing of a circuit of a battery through one or more or all of the coils of the solenoids causing one or more or all of the solenoids above it or them to be drawn downward whereby the type wheel is turned to any required point. On the circuit being opened the spring $n'$ raises the solenoids to their normal position and causes the type wheel to return to its normal position.

Instead of actuating the type wheel through the engagement of a toothed sector or a rack with a pinion on the type wheel shaft this may be effected by the attachment of a flexible connection directly to the type wheel shaft or to a pulley thereon in which case the type wheel is caused to revolve in one direction by means of the strain on the said connection and in the other direction by means of a spring or weight. Where a flexible connection is used with the arrangement hereinbefore described with reference to Figs. 3 and 4 one end of the said connection is attached to the arm $k^6$ and where the said connection is used with the arrangement hereinbefore described with reference to Figs. 6 and 7 one end of the said connection is attached to the plate $n^2$, or the type wheel may be actuated or its motion may be governed through any equivalent construction or arrangement of intermediate connections or mechanism by which varying extent of motion may be communicated to the said wheel by the motion of one or more or all of the armatures of a series of magnets or the cores of a series of solenoids which means of actuating the type wheel constitutes the essential feature of this part of my invention.

The flexible connection may be of any material which will not be perceptibly liable to variation of length in consequence of the tensile strain thereon consequent on the working of the apparatus or in consequence of variation of temperature or of moisture in the atmosphere. Unspun silk or a fine metal chain are suitable for the purpose.

In all cases where the turning of the wheel is effected or permitted when the circuit or circuits through the coils of one or more of a series of magnets is closed, the parts may be arranged so that the type wheel may be operated when the circuits are open, and the flexible connection for turning the type wheel may be either normally straight and flexure produced therein to turn the wheel, or it may be normally flexed and the wheel turned by permitting it to straighten.

My said improvements consist further of the arrangements hereinafter described of the keys and contacts of transmitting instruments of type printing telegraphs worked on systems such as that known as the Baudot system which improvements are applicable to printing telegraphs on which receiving instruments or printing instruments provided with my improvements hereinbefore described are used; and my said improvements consist further of the means hereinafter described for preventing a current from being sent out to line if any of the keys of the transmitting instrument be depressed after the trailer of the distributer has passed the first of the segments or group of segments connected with the same key, the object of this part of my invention being to prevent a false combination of currents being sent to line.

According to that part of my invention constituting the first of the said improvements I provide a separate key for each combination which represents a letter or character on the type wheel and I arrange relatively to each one of the several keys the contacts connected to those segments of the distributer through which the current must be sent to make the combination for the particular letter or character required to be brought to the printing point by the separate depression of any one of the keys.

According to that part of my invention which relates to the prevention of a false combination of currents being sent to line I connect the main battery with the keys of the transmitter through the contacts of a relay by which the circuit of the said battery is closed or opened according to the position of the tongue of the said relay which relay is actuated so as to close or open the said circuit as required by the completion of the circuits of local batteries through one or other of the magnets of the said relay the latter circuits being closed and opened at the required times by means of a supplementary trailer on the ordinary trailer arm passing over contacts on the distributor, or I effect the said object by locking the keys of the transmitting instrument at the required times by means of magnets placed in a circuit which is opened and closed at the required times by the rotation of the trailer arm the armatures of which magnets are so arranged relatively to the said keys that the latter are locked and liberated at different points in the path of rotation of the trailer.

Figure 8:
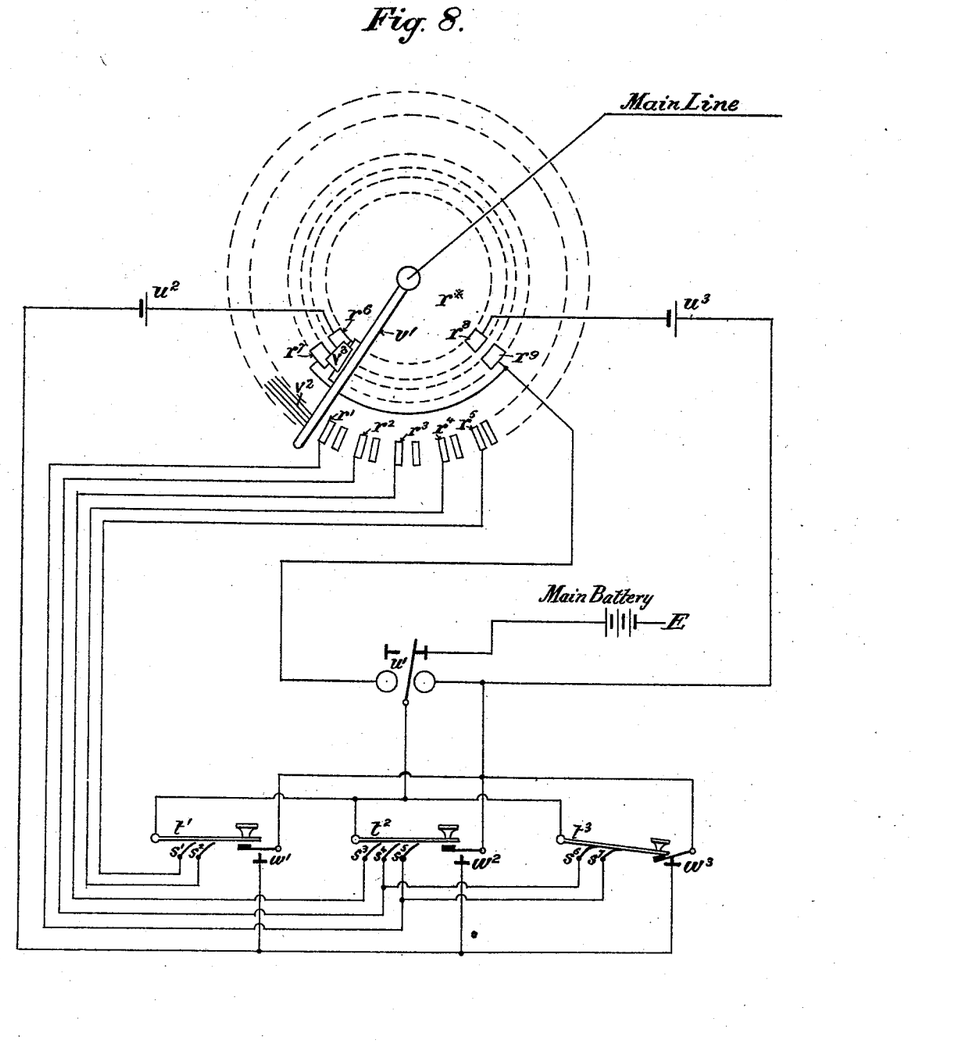
Fig. 8 is a diagram illustrating an arrangement of the keys and contacts and also one of the arrangements for automatically connecting the main battery to and disconnecting it from the keys of the transmitter by the rotation of the trailer arms.

Fig. 8 of the accompanying drawings is a diagram illustrating the aforesaid arrangement of the keys and contacts and also one of the said arrangements for automatically connecting the main battery to and disconnecting it from the keys of the transmitter by the rotation of the trailer arm.

Referring to the said Fig. 8 — $r^*$ is the distributer $r'\ r^2\ r^3\ r^4\ r^5$ are the sending out segments of one of the groups of segments $s'\ s^2$, $s^3\ s^4\ s^5$ and $s^6\ s^7$ are three of the groups of contacts connected to the said segments and $t'\ t^2\ t^3$ are three of the transmitting keys each of which keys is connected to the main battery through the contacts of a polarized relay $u'$. Under each of the other keys of the instrument (which are not shown in the drawing) is similarly arranged one of the several groups of contacts through each of which groups respectively the current is required to be sent to make the combination required to bring one or other of the several other letters or characters on the type wheel separately to the printing point. Consequently the type wheel is turned to the extent necessary to bring each of the said letters or characters to the printing point by the separate depression of one or other of the several keys.

$v'$ is the trailer arm of the distributer.

$v^2$ is the ordinary trailer and $v^3$ is the supplementary trailer which is insulated from the trailer arm.

$r^6\ r^7\ r^8\ r^9$ are contacts on the disributer arranged in the path of motion of the trailer $v^3$. $u^2\ u^3$ are local batteries in the circuits of which the relay $u'$ is placed which relay and batteries are connected to the contacts $r^6\ r^7\ r^8\ r^9$ and to circuit closers arranged under the transmitting keys three of which circuit closers marked $w'\ w^2\ w^3$ are shown in the diagram. Contacts corresponding to those marked $r^6\ r^7\ r^8\ r^9$ and similarly connected to relays corresponding to the relay $u'$ and also connected to the batteries $u^2\ u^3$ are similarly arranged relatively to each of the other groups of segments on the distributer and to the keys of the other transmitting instruments. By means of the arrangement described of the said contacts and of the parts connected thereto and acting in conjunction therewith the main battery is connected with the keys only if one of the said keys be depressed while the supplementary trailer $v^3$ is touching simultaneously the contacts $r^6$ and $r^7$ when the said battery remains so connected until the said trailer touches simultaneously the contacts $r^8\ r^7$, the touching of which contacts by the trailer $v^3$ causes the battery to be disconnected from the keys. Consequently a current cannot be sent to line through any segment through the group of segments shown in the diagram if the supplementary trailer has passed the contacts $r^6\ r^7$ before the key is depressed until by the rotation of the trailer arm the trailer $v^3$ again touches the said contacts $r^6$ $r^7$.

In the said Fig. 8 and in the other figures hereinafter referred to the earth connections of the batteries are marked E.

The effect of the contacts and instruments which are arranged relatively to the other group of segments not shown in the diagram is the same relatively to those groups as the effect described with reference to that shown.

Figure 9:
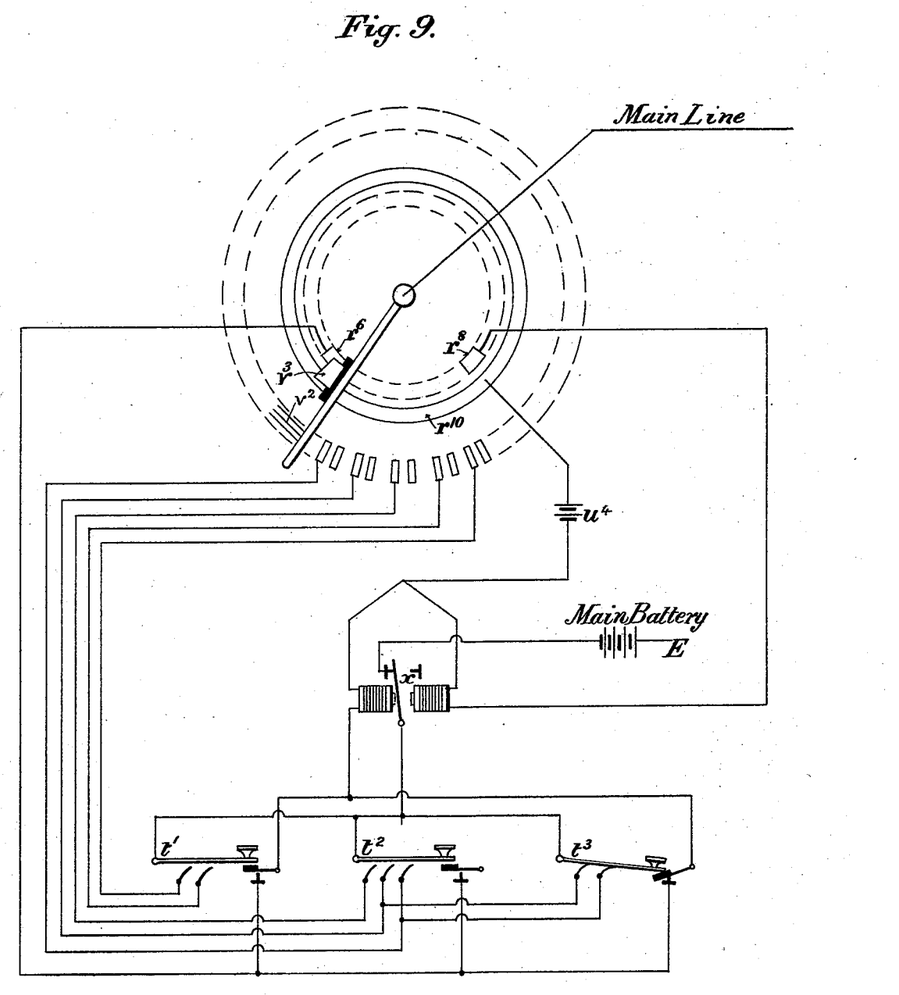
Fig. 9 is a diagram illustrating a modification of the arrangement shown in Fig. 8.

Fig. 9 is a diagram illustrating a modification of the arrangement described with reference to Fig. 8 which modification consists in the substitution of one local battery $u^4$ for the two local batteries and in the substitution of a continuous contact $r^{10}$ for the two contacts $r^7$ $r^9$ and the other contacts corresponding therewith and in the substitution of a neutral relay $x$ for the polarized relay. The action of the said arrangement is as follows: If any of the keys be depressed while the trailer $v^3$ is passing the contact $r^6$ the circuit of the battery $u^4$ is completed through the the left hand magnet of the relay $x$ whereby the tongue of the said relay is drawn to the left connecting the main battery to the keys and the said battery remains so connected until the trailer $v^3$ passes the contact $r^8$ when the circuit of the said battery $u^4$ is completed through the right hand magnet of the said relay $x$ whereby the tongue of the said relay is drawn to the right and the main battery is disconnected from the keys.

Figure 10:
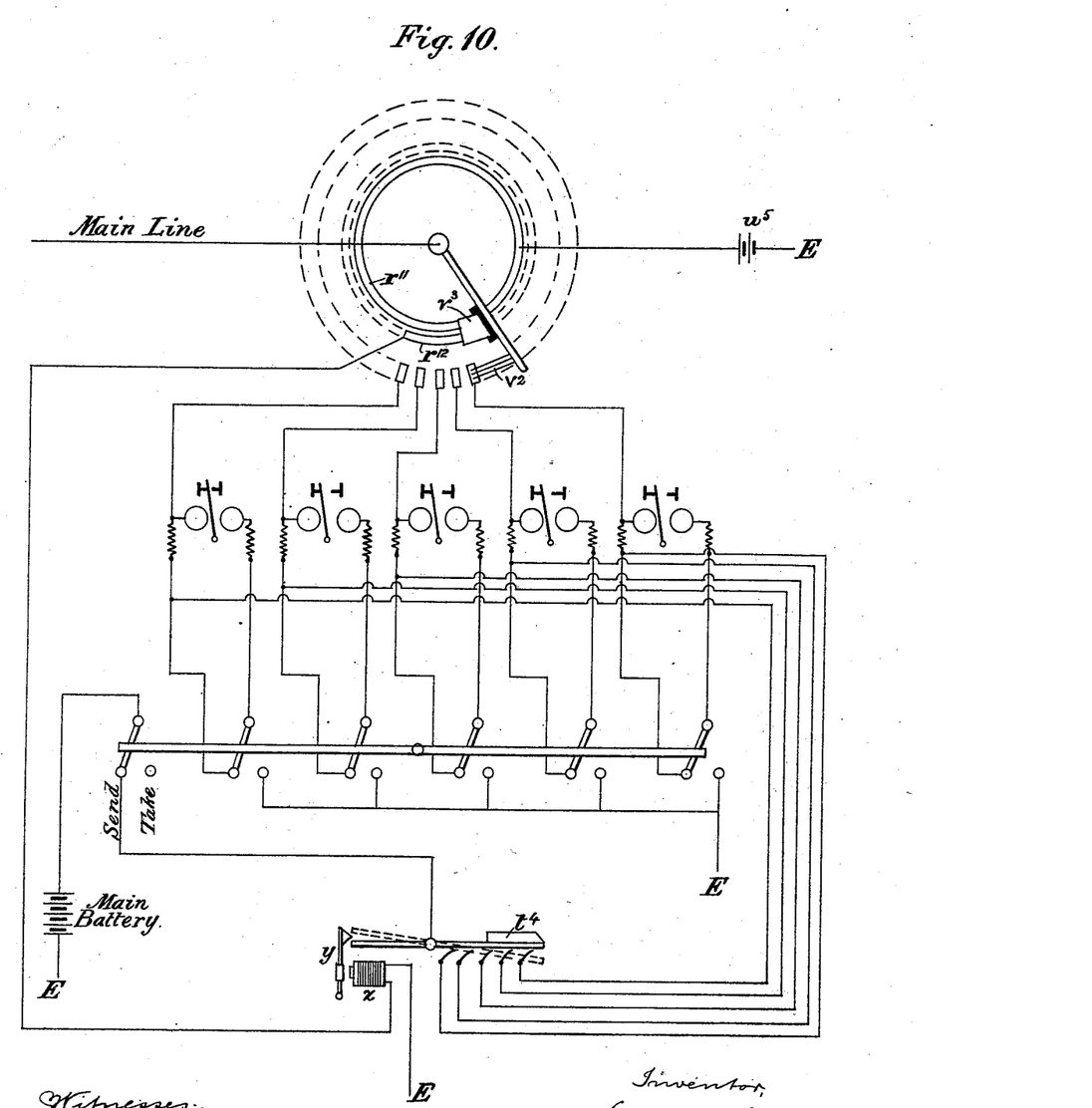
Figs. 10 and 11 are diagrams illustrating arrangements of the circuits and devices for locking and operating the magnets and keys.

Fig. 10 is a diagram illustrating the arrangement for locking the keys of the transmitting instrument at the required times the said arrangement being shown in conjunction with a distributer in which the same segments are used for both sending and receiving. Referring to the said diagram $y$ is a catch lever so arranged relatively to the keys (one of which is shown at $t^4$) that it may be caused to engage with and hold the said keys in either their normal position or their depressed position and $z$ is a magnet by which the said catch lever is actuated. $r^{11}$ is a continuous contact on the distributer connected to the local battery $u^5$ over which contact the trailer $v^3$ travels and $r^{12}$ is another contact on the distributer which contact is placed in the path of motion of the trailer $v^3$ and is connected to the magnet $z$. This arrangement prevents the keys from being depressed while the trailer $v^3$ is touching both the contacts $r^{11}$ $r^{12}$ during which time the main trailer $v^2$ is passing over the group of segments connected to the contacts under the keys and the said arrangement also causes any one of the keys when depressed to be held in the depressed position while the trailer $v^3$ touches both the said contacts and to remain so held until the trailer $v^3$ passes off the contact $r^{12}$.

Although I have illustrated the arrangement hereinbefore last described only in conjunction with a distributer in which the same segments are used for both sending and receiving the said arrangement is applicable to any instrument used on synchronous multiplex systems in cases where it is necessary or desirable that the sending of the current to line be automatically governed according to the position of the trailer relatively to the group of segments connected to the same instrument.

My said invention consists further in bringing the main relays of the receiving instruments of telegraphs worked on synchronous multiplex systems to their normal position by apparatus actuated by the press lever after the required combination has been formed which apparatus may be either electrical or mechanical. In the case of electrical apparatus the tongues of the said relays are thrown to their normal position by closing a circuit through their coils in the required direction by the action of the press lever and in the case of mechanical apparatus the said tongues are actuated by contact therewith of any suitable arrangement of mechanism connected to the press lever.

Fig. 11 is a diagram of an arrangement by which a current is caused by the action of the press lever to be sent through the magnets of the relays in the direction which throws them to their normal position. Referring to the said diagram 2 2 2 2 2 are the main relays. 3 is the press lever which carries a group of contacts 4 connected to a battery 5. 6 are other contacts connected to the coils of the said relays and so situated relatively to the contacts carried by the press lever that when the latter is actuated the circuit of the battery 5 is completed through the said coils in the direction to throw the tongues of the said relays to their normal position, i. e., to the left.

Figure 12:
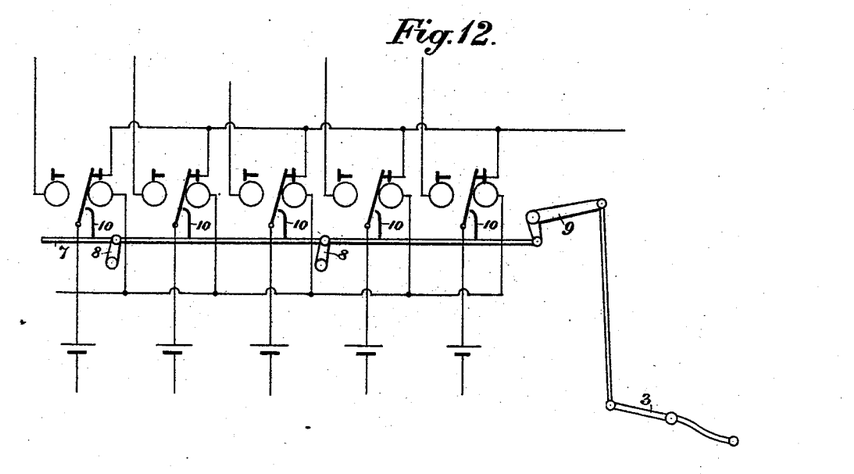
Figs. 12 and 13 are diagrams illustrating the arrangement of the tongues of the relays.
Figure 13:
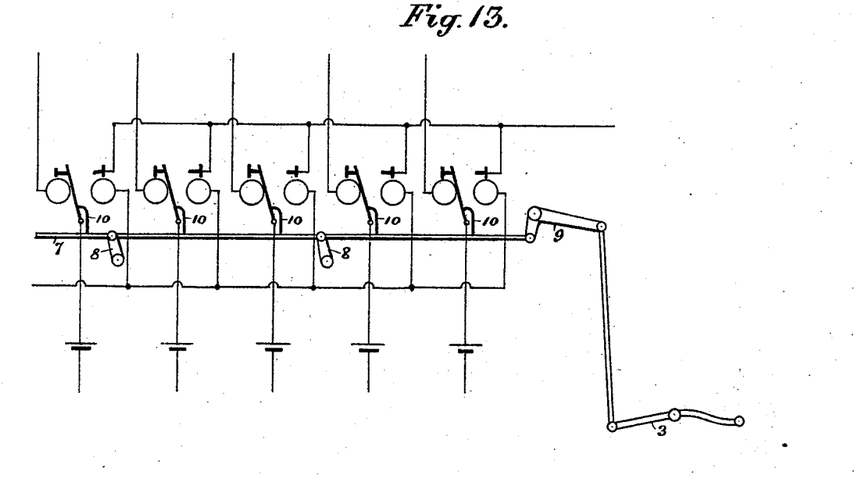

Figs. 12 and 13 are diagrams illustrating an arrangement by which the tongues of the relays are mechanically thrown to their normal positions when the press lever is actuated. Referring to the said figures—7 is a rod jointed to links 8, 8 and to a cranked lever 9 connected to the press lever 3 and carrying fingers 10, 10. When the press lever is in its normal position as shown in Fig. 12 the said fingers are not in contact with the tongues of the relays and when the press lever is actuated the said rod is shifted endwise and the said fingers throw the tongues of the relays to the left as shown in Fig. 13.

It is evident that other equivalent constructions and arrangements of devices may be used by those skilled in the art for accomplishing substantially the purposes herein set forth, without departing from the spirit of my invention which is broadly set forth and claimed herein.

Solenoids may be substituted for the magnets in all or any of the arrangements hereinbefore described.

Having thus described my invention of improvements in type-printing telegraphs, I declare that I claim as my said invention—

1. The improvements herein described in receiving and printing instruments of type printing telegraphs, consisting in the combination of a type wheel, a flexible connection connected to operate the type wheel, and a series of magnets the armatures or cores of which operate upon the flexible connection to control the movements of the type wheel, substantially as described.

2. In a printing telegraph, the combination of a type wheel, a flexible connection connected to the type wheel to operate the same, a securing device for one end of the flexible connection, and a series of magnets the armatures or cores of which operate upon the flexible connection to move the type wheel, substantially as described.

3. In a printing telegraph, the combination of a type wheel, a lever provided with a rack for moving the type wheel, a flexible connection connected with the lever at one end and to a standard at the other end, and a series of magnets the armatures or cores of which operate upon the flexible connection to move the type wheel, substantially as described.

4. In a printing telegraph, the combination with the type wheel, of a flexible connection connected to move the type wheel, a standard having means for adjustably supporting one end of the flexible connection, a series of stationary pulleys over which the connection passes, and a series of movable pulleys, each operated by its separate magnet for controlling the connection, substantially as described.

5. In arrangements for producing or permitting various extents of motion of the type wheel of the receiving or printing instruments of printing telegraphs the combination of a flexible or pliant connection with the armatures of a series of magnets or the cores of a series of solenoids by which portions of the said connections are normally kept in a state of flexure and by the motion of which various degrees of reduction of the extent of flexure are produced.

6. In a printing telegraph, the combination of the type wheel, a flexible connection connected to operate the type wheel, a series of magnets the armatures or cores of which operate upon the flexible connection, a series of keys, a circuit distributer and circuits therefrom having contacts arranged in juxta-position to the keys whereby on the depression of a key any one or any combination of the magnets may be operated according to the arrangement of the contacts with respect to the particular key, substantially as described.

7. In transmitting instruments of type printing telegraphs for use with synchronous multiplex systems the combination of a separate key for each letter or character on a type wheel and the separate connection for the segments of the distributer with contacts arranged in groups relatively to certain of the keys whereby the separate depression of one or other of them causes the main battery to be connected to any required combination of the said segments.

8. In transmitting instruments of type printing telegraphs for use with synchronous multiplex systems the combination of the main battery with the transmitting apparatus connected through the contacts of a relay placed in the circuit of a battery or in the circuits of batteries connected to contacts on the distributer the action of which relay is governed by the depression of any one of the keys of the transmitter.

9. In transmitting instruments of type printing telegraphs for use with synchronous multiplex systems the combination with the transmitting keys, segments, and trailer; of means substantially as described by which the transmitting keys are locked in either their normal position or their depressed position said means actuated by the current from a battery the circuit of which is either opened or closed while the trailer is passing over the main line segments.

10. In receiving apparatus of type printing telegraphs for use with synchronous multiplex systems the combination with the press lever, relays, and tongues; of means substantially as described actuated by the press lever and causing the tongues of the main relays to be thrown to their normal position each time the press lever is actuated to take an impression from the type wheel.

GEORGE AUGUSTUS SCOTT.

Witnesses:
J. C. FRANK,
3 *Newman's Court, Cornhill, London, E. C.*
W. T. WHITEMAN,
7 *Staple Inn, London.*